3,215,661
VINYLIDENE CHLORIDE POLYMER COMPOSITIONS HAVING IMPROVED LOW TEMPERATURE PROPERTIES
George J. Butzler, Midland, and William D. Shelburg, Bay City, Mich., and George B. Sterling, Mogadore, Ohio, assignors to The Dow Chemical Company, Midland, Mich., a corporation of Delaware
No Drawing. Filed Apr. 18, 1963, Ser. No. 273,813
8 Claims. (Cl. 260—31.8)

This invention relates to polymeric compositions and, in particular, to polymeric compositions based on vinylidene chloride polymers and copolymers.

Polymers and copolymers of vinylidene chloride with such comonomers as acrylonitrile, vinyl chloride, and lower alkyl acrylates have found wide use as films for packaging of foodstuffs and other articles. Such films posses many useful properties, such as inertness, ability to be heat-sealed, transparency, shrinkability, and low water vapor transmission rates, which are desirable for packaging foodstuffs. However, prior vinylidene chloride polymer films suffered the disadvantage of becoming brittle and losing strength and other qualities at low temperatures. Prior art attempts to plasticize these copolymers have not generally been successful in overcoming those problems. The compatibility of liquid plasticizers with vinylidene chloride polymers is restricted which limits low temperature flexibility. Such liquid plasticizers also have a tendency to bleed out of the composition which is undesirable for packaging of certain foods.

Accordingly, it is a principal object of this invention to provide polymeric compositions based on polymers of vinylidene chloride which compositions retain their flexibility and other properties at low temperatures, such as are encountered in refrigerated foodstuffs and frozen foodstuffs.

It is a further object of this invention to provide polymeric compositions which are relatively impermeable to water vapor and other gases.

Other and related objects will become evident from the following specification and claims.

The polymeric compositions of this invention comprise a blend of (I) from about 70 to 95 percent by weight of the composition of a normally crystalline polymer consisting of (a) from 70 to 100 percent by weight of vinylidene chloride and (b) 0 to 30 percent by weight of at least one monoethylenically unsaturated comonomer and (II) complementarily, from about 5 to 30 percent by weight of the composition of a rubbery copolymer consisting of (1) from about 95 to 50 percent by weight of chloroprene and (2) complementarily, from about 5 to 50 percent acrylonitrile.

The normally crystalline vinylidene chloride polymers usable in this invention are well known and may be prepared by interpolymerizing vinylidene chloride with known comonomers. Typical of the normally crystalline polymeric materials falling within the advantageous definition are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloroprene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride and vinyl ethers and vinyl chloride. Quaternary polymers of similar monomeric compositions will also be known.

The rubbery copolymers which impart low temperature flexibility to the vinylidene chloride polymer are copolymers of (1) about 95 to 50 percent by weight chloroprene and (2) complementarily, from about 5 to 50 percent by weight acrylonitrile and advantageously having a Mooney viscosity at 212° F. of between about 30 and 150, and preferably between 30 and 120. Such copolymers are known and can be prepared by copolymerizing the monomeric ingredients in the desired proportions in usual ways. Thus, they can be prepared by polymerizing the required amounts of chloroprene and acrylonitrile in aqueous emulsion employing a redox type recipe, i.e. a formulation wherein both oxidizing and reducing components are present.

The polymeric blends of the invention may include plasticizers, such as dioctyl phthalate, dibutyl sebacate, and the like, in the range of about 2 to 10 percent by weight of the composition. Such blends may also include antioxidants, light stabilizers, and other additives known in the art which do not deleteriously affect the properties of the film.

The polymer blends of the invention are preferably prepared by: mixing latexes of the vinylidene chloride polymers and of the rubber-like interpolymer in the proper proportions, coagulating the latex blend with alum or other known coagulants, and recovering the dried polymer. The polymer blends are preferably extruded in tube form, stretched and oriented by the bubble technique and slit to form films as is known in this art. The compositions are useful in other processes, such as molding, slot extrusion, and other thermal fabrication techniques, to form films, fibers, foils, molded articles, and other forms having the superior properties.

The products of this invention will be illustrated with the following example in which all percentages and parts are by weight.

EXAMPLE

A latex containing 34 percent solids of a copolymer composed of 73 percent by weight vinylidene chloride and 27 percent by weight of vinyl chloride was prepared by emulsion polymerization, utilizing a mixture of potassium persulfate and sodium bisulfite as the catalyst and an alkyl benzene sodium sulfonate, available commercially as "Ultrawet DS," as the emulsifier, in a manner well known in the art.

A polymer blend composed of (I) 85 percent by weight of the vinylidene chloride/vinyl chloride copolymer as described herein, and (II) 15 percent by weight of a rubbery copolymer composed of about 81 percent by weight chloroprene and about 19 percent by weight acrylonitrile, having a Mooney viscosity at 212° F. of about 120, was formed by blending the desired proportions of the hereinbefore described vinylidene chloride copolymer latex with a commercially available chloroprene/acrylonitrile copolymer latex, and subsequently coagulating and drying the blend. To each polymer blend was then individually added 7 weight percent, based on the total weight of the dried polymer blend, of the plasticizer dibutyl sebacate, and 0.5 weight percent of MgO.

The polymer blend was then thermally extruded using standard bubble techniques into an oriented film having a thickness of 0.001 inch. A similarly prepared film of unmodified vinylidene chloride copolymer containing 7 percent dibutyl sebacate and 0.2 percent MgO was employed for comparative purposes.

The following table illustrates the composition of the rubbery latex, and the results of the physical properties determined on the above-described oriented films. The column headings of such table have the following meanings:

Clarity _____ Visual rating of oriented film.
O₂ Transmission ____ Cc. at S.T.P./100 in.²/24 hrs./mil at 1 atmosphere driving force.
Cold Flex _____ Number of hand flexes at −18° C. (0° F.) to produce rupture.

Tensile strengths, both longitudinal and transverse, and percent elongation, for each of the oriented films were also determined by conventional procedures utilizing a Scott IP–4 Tester.

TABLE

*Oriented films*

[Blends of vinylidene chloride copolymer and chloroprene/acrylonitrile rubbery copolymer and 7 percent dibutyl sebacate and 0.5 percent MgO]

| Run No. | Rubbery Latex | | | | Properties of Oriented Film | | | | | | |
|---|---|---|---|---|---|---|---|---|---|---|---|
| | Trade Designation | Chloroprene, Percent | Acrylonitrile, Percent | Mooney Visc. | Clarity | O₂ Transmission | Cold Flex, −18° C. | Tensile (p.s.i.×10⁻²) | | Elongation, Percent | |
| | | | | | | | | Long. | Trans. | Long. | Trans. |
| For Comparison: 1 | | | | | Good | 19 | 1–2 | 97 | 78 | 107 | 70 |
| This Invention: 2 | Neoprene Latex, Type 450. | 81 | 19 | 120 | Good | 20 | 10+ | 80.7 | 81.9 | 112 | 102 |

From the above data it can be seen that incorporation of the chloroprene/acrylonitrile rubbery copolymer described herein, into normally crystalline vinylidene chloride polymers, produces most favorable films and other articles for low temperature utility while retaining the desirable physical characteristics of those vinylidene chloride polymers.

Similar good results are obtained from any composition comprising (I) from about 70 to 95 percent by weight of the composition of a normally crystalline polymer consisting of (a) 70 to 100 percent by weight of vinylidene chloride and (b) 0 to 30 percent by weight of at least one monoethylenically unsaturated comonomer and (II) from about 5 to 30 percent by weight of a rubbery copolymer consisting of (1) from about 95 to 50 percent by weight of chloroprene and (2) complementarily, from about 5 to 50 percent acrylonitrile.

What is claimed is:

1. A polymeric composition comprising a blend of (I) from about 70 to 95 percent by weight of the composition of a normally crystalline polymer selected from the group consisting of polyvinylidene chloride and interpolymers of at least about 70 percent by weight of vinylidene chloride with up to about 30 percent by weight of at least one other monoethylenically unsaturated comonomer and (II) complementarily, from about 5 to 30 percent by weight of the composition of a rubbery copolymer of (1) from about 95 to 50 percent by weight chloroprene and (2) complementarily, from about 5 to 50 percent by weight of acrylonitrile.

2. The composition as claimed in claim 1, wherein said normally crystalline polymer is a copolymer of vinylidene chloride and vinyl chloride.

3. The composition as claimed in claim 2, wherein said normally crystalline polymer is a copolymer of 73 percent by weight of vinylidene chloride and 27 percent by weight of vinyl chloride.

4. The composition as claimed in claim 1, containing from 2 to 10 percent by weight of the composition of a plasticizer for a crystalline vinylidene chloride polymer.

5. The composition as claimed in claim 4, wherein said plasticizer is dibutyl sebacate.

6. A polymeric composition comprising a blend of (I) 85 percent by weight of the composition of a normally crystalline polymer consisting of (a) 73 percent by weight of vinylidene chloride and (b) 27 percent by weight of vinyl chloride and (II) 15 percent by weight of the composition of a rubbery copolymer of (1) about 81 percent by weight chloroprene and (2) complementarily, about 19 percent by weight acrylonitrile.

7. An oriented film having improved flexibility at temperatures below 32° F. composed of a homogeneous blend of (I) about 85 percent by weight of the film of a normally crystalline polymer consisting of (a) 73 percent by weight of vinylidene chloride and (b) 27 percent by weight of vinyl chloride and (II) about 15 percent by weight of the film of a rubbery copolymer of (1) from about 95 to 50 percent by weight of chloroprene and (2) complementarily, from about 95 to 50 percent by weight of acrylonitrile.

8. The oriented film of calim 7, wherein said rubbery copolymer consists essentially of (1) about 81 percent by weight chloroprene and (2) complementarily, about 19 percent by weight of acrylonitrile.

References Cited by the Examiner

UNITED STATES PATENTS 2,552,904   5/51   Newberg et al. _____ 260—891
2,779,687   1/57   Buchanan et al. _____ 260—45
3,063,961   11/62  Frank _____ 260—31

OTHER REFERENCES

Buttrey: Plasticizers, Frankling Publishing Company, New Jersey, chapter 4, page 76, 1960.

MORRIS LIEBMAN, *Primary Examiner.*

ALEXANDER H. BRODMERKEL, *Examiner.*